United States Patent
Humpert et al.

(10) Patent No.: US 6,973,357 B2
(45) Date of Patent: Dec. 6, 2005

(54) METHOD AND CONFIGURATION SYSTEM FOR PRODUCING AN APPLICATION-SPECIFIC FUNCTIONAL MODULE FOR A PROGRAMMABLE CONTROLLER

(75) Inventors: Hans-Dieter Humpert, Hemhofen (DE); Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 244 days.

(21) Appl. No.: 10/442,134

(22) Filed: May 21, 2003

(65) Prior Publication Data

US 2003/0220703 A1 Nov. 27, 2003

(30) Foreign Application Priority Data

May 22, 2002 (EP) .................................. 02011280

(51) Int. Cl.⁷ ............................................. G05B 19/42
(52) U.S. Cl. ........................... 700/87; 700/17; 700/18; 700/83; 700/86; 708/230; 715/734; 715/735; 715/762; 715/763; 715/965; 715/967; 715/969; 717/105; 717/109; 717/113; 717/125; 712/36; 712/37; 326/38
(58) Field of Search ............................... 700/17, 18, 83, 700/86, 87; 717/105, 109, 113, 125; 715/734, 715/735, 762, 763, 965, 967, 969; 712/36, 712/37; 326/38; 708/230

(56) References Cited

U.S. PATENT DOCUMENTS

| | | | |
|---|---|---|---|
| 5,168,441 A | | 12/1992 | Onarheim et al. |
| 5,592,373 A | * | 1/1997 | Barthel et al. ................. 700/79 |
| 5,698,806 A | * | 12/1997 | Yamada et al. ............... 84/615 |
| 5,801,942 A | | 9/1998 | Nixon et al. |
| 5,838,563 A | * | 11/1998 | Dove et al. .................... 700/83 |
| 5,884,079 A | * | 3/1999 | Furusawa ................... 717/109 |
| 6,054,986 A | * | 4/2000 | Kato .......................... 715/763 |
| 6,173,208 B1 | * | 1/2001 | Park et al. .................... 700/83 |
| 6,366,300 B1 | * | 4/2002 | Ohara et al. ................ 715/771 |
| 6,571,133 B1 | * | 5/2003 | Mandl et al. ................. 700/18 |
| 2002/0009224 A1 | * | 1/2002 | Gatti et al. ................. 382/154 |
| 2002/0047865 A1 | * | 4/2002 | Bozionek et al. ........... 345/763 |
| 2002/0054099 A1 | * | 5/2002 | Schmitt et al. ............. 345/762 |
| 2003/0132965 A1 | * | 7/2003 | Santori et al. .............. 345/763 |

* cited by examiner

*Primary Examiner*—Anthony Knight
*Assistant Examiner*—Douglas Shute
(74) *Attorney, Agent, or Firm*—Harness, Dickey & Pierce, P.L.C.

(57) ABSTRACT

A method and configuration system are used for producing an application-specific functional module from a predefined functional module for a programmable controller. In this context, a marking device is useable to mask out subfunctions of the predefined functional module, so that just the software code for those subfunctions which is required in order to satisfy the functionality of the application-specific functional module are readable into the programmable controller. In this case, it is simultaneously necessary to ensure that only that software code which is not imperatively required for calculating a result for at least one of the unmarked subfunctions is masked out and is therefore not read in.

6 Claims, 2 Drawing Sheets

METHOD AND CONFIGURATION SYSTEM FOR PRODUCING AN APPLICATION-SPECIFIC FUNCTIONAL MODULE FOR A PROGRAMMABLE CONTROLLER

The present application hereby claims priority under 35 U.S.C. §119 on European patent application number EP 02011280.1 filed May 22, 2002, the entire contents of which are hereby incorporated herein by reference.

BACKGROUND OF THE INVENTION

In modern technical installations, a large number of method steps, such as complex control of a component in the technical installation, are normally performed by at least one automation system into which control code has been loaded for the purpose of automatically performing the desired function.

In the course of time, the field of automation technology has produced frequently arising objectives to be achieved which need to be dealt with using the automation systems in ever recurrent instances of application. For a large number of these objectives, functional modules produced from software code have been created as prototypes which can be used to achieve a particular type of objective, for example controlling an installation component using a PID controller.

In this case, the PID controller can be created as a predefined functional module which can be used for a large number of control tasks. To bring such a predefined functional module into line with a specific control task, it is necessary to supply the predefined functional module with current values for its prescribable parameters so that the specific control task can be performed using the predefined functional module. In the case of the PID controller, the minimum requirement is specification of the current values for the parameters of proportional gain, control time and integration time constant, for example.

In the case of known predefined functional modules, which are normally brought together in software libraries, classified according to particular objectives, it is very often necessary, for the purpose of performing a given task using the predefined functional module, to supply said functional module with a large number of current values for its parameters. By way of example, predefined complex PID-controller functional modules are available which require approximately 100 parameters to be prescribed.

The often very large number of prescribable parameters is explained by the fact that the predefined functional modules need to be suitable for achieving a wide variety of forms of an objective. Otherwise, it would make no sense to keep a predefined functional module in a software library. This is true since performing a specific task would in fact require creation of a new functional module in most cases, which would restrict the desired reusability of predefined functional modules in the extreme.

Known predefined functional modules generally comprise a plurality of subfunctions whose contribution to performing the given task can be stipulated by prescribing parameters.

Many automation tasks arising in practice allow the use of predefined functional modules, but only in some cases does performance of the given automation task require all of the subfunctions covered by the predefined functional module. When prescribing the parameters for the functional module, the subfunctions which are not required then need to be supplied with current parameter values such that, by way of example, they do not affect the results calculated by the subfunctions which are required. By way of example, logarithm modules are known which are used to calculate the logarithm for an applied input signal, this calculated value then being able to be multiplied by a factor in a second subfunction. If this second subfunction of the predefined logarithm module is now not needed, the second subfunction needs to be supplied with a current parameter value equal to 1, so that the second subfunction merely multiplies the logarithm of the input signal—which is calculated by the first subfunction—by the factor 1, which does not disturb the calculated value, as is desired. However, this requires that the multiplication parameter for the second subfunction be prescribed, with prescription of this parameter being unnecessary per se because the corresponding subfunction is not required.

The advantage of being able to reuse the predefined functional module is thus counterbalanced by the drawback of increased complexity for prescribing the parameters for the subfunctions when not all of the subfunctions of the predefined functional module are required for performing the automation task.

If, by way of example, the aforementioned predefined functional module of a PID controller is considered, the PID controller can naturally be used to control an installation component using a PI controller. In this case, however, it is necessary to ensure that that subfunction of the predefined PID controller which provides the D component of the PID controller is disabled by virtue of suitable prescription of current parameters, inter alia, so that the predefined PID controller can perform the desired function as a PI controller.

Just as in the case of the example of the logarithm module, the advantage of being able to reuse the predefined PID controller is counterbalanced by the drawback of great complexity for prescribing parameters for the PID controller when the PID controller is to be used just as a PI controller.

From these two relatively simple examples, it can already be seen that the use of predefined functional modules for performing an automation task affords the advantage that the software for performing the automation task does not need to be rewritten, but that the use of a predefined functional module for performing a specific automation task usually requires many more parameters to be prescribed than are actually required for performing the automation task.

Often, control functions, for example for power plants, are performed using graphical configuration tools. In this context, it is known practice to place graphical module symbols for the functional modules in a work area for the configuration tool and either to connect signal inputs and signal outputs on the module symbols to signal inputs and/or signal outputs on other module symbols, in particular, or to supply them with parameter values.

These module symbols which have been connected and/or have been supplied with parameters are used to form function diagrams which are translated, in a subsequent step using software code generators, in the software code which can be executed on automation systems. Some earlier configuration systems also work as interpreters, so that the graphical function diagrams are then a direct depiction of the automation system.

The graphical function diagrams can be based on various standards, such as IEC1131, IEC1499 or VGB.

As already mentioned, known predefined functional modules usually include a series of subfunctions which need to be supplied with parameters even if one or more subfunctions are not actually needed for performing a current automation task. Thus, the configuration of such predefined functional modules and hence also of the corresponding function diagrams, which often have a large number of predefined functional modules connected, is very complex. In addition, there is a very large memory space requirement in the programmable controllers on which the software code corresponding to the functional modules and/or function diagrams is to be executed.

Many users of automation systems require the simplest possible, reusable functional modules to be made available. However, this requirement has usually not been met to date on account of the fact that such simplified functional modules are no longer able to perform a large number of automation tasks. Any reusability of functional modules simplified in this manner would be too greatly restricted or at least would be confined to very limited instances of application. In addition, performance of complex automation tasks, in particular, would then require a wealth of predefined, simplified functional modules to be made available, which makes it virtually impossible for such very extensive software libraries to be kept comprehensible any longer.

SUMMARY OF THE INVENTION

An embodiment of the invention is therefore based on an object of specifying an improved method and an improved configuration system for producing an application-specific functional module from a predefined functional module. In particular, its intention is to ensure that the application-specific functional module to be produced is of high quality and has low susceptibility to error.

For the method, an embodiment of the invention achieves the object by use of a method for producing an application-specific functional module for an automation system from a predefined functional module, the predefined functional module comprising at least two subfunctions implemented by means of software code, having the following steps:

1. A block diagram graphically describing the predefined functional module is loaded into a data processing system, each subfunction having at least one associated representational block in the block diagram, and the representational blocks each comprising at least one signal input and/or at least one signal output which are supplied with prescribed parameters and/or which are connected to at least one signal input and/or signal output on another representational block by means of a connecting line.

2. Those representational blocks and/or connecting lines which are not needed for implementing a desired functionality of the application-specific functional module are provided with a respective marking in the block diagram, and 3. If output values supplied by the signal outputs of the marked representational blocks are not imperatively required by any of the unmarked representational blocks as input values for at least one of their respective signal inputs for the purpose of calculating a result value for at least one of their signal outputs, the programmable controller is loaded only with the software code for those subfunctions whose corresponding representational blocks are unmarked, and, if output values supplied by the signal outputs of the marked representational blocks are imperatively required by at least one of the unmarked representational blocks as input values for at least one of their respective signal inputs for the purpose of calculating a result value for at least one of their signal outputs, the programmable controller is loaded with the software code for those subfunctions whose corresponding representational blocks are unmarked and with the software code for those subfunctions whose corresponding representational blocks are marked and whose output values applied to their respective signal outputs are imperatively required by at least one of the unmarked representational blocks as input values for at least one of their respective signal inputs.

In this case, an embodiment of the invention is based on the consideration that an application-specific functional module can easily be produced from a predefined functional module if the starting point is a block diagram of the predefined functional module which graphically describes the predefined functional module and also its subfunctions. In this way, the subfunctions provided by the predefined functional modules and the relevance of the subfunctions to the automation task which is to be performed are particularly easily for the user to identify. The inventive method now provides a simple way for the user to identify those connections between the representational blocks, and those representational blocks, which are not needed for performing the present automation task, and to provide them with a marking. Such marked connections/connecting lines and/or representational blocks are then ignored when loading the corresponding software code into the automation system, provided that no unmarked representational block and/or connecting line imperatively requires a value which is made available by at least one of the marked elements.

This ensures, in particular, the quality of the application-specific functional module, particularly insofar as the user cannot inadvertently mask out software code for marked elements, which can lead to incorrect results calculated by the application-specific functional module. For this reason, the inventive method makes provision for only the software code which is required for performing the automation task to be loaded into the programmable controller, but for this also to include the software code for marked subfunctions if the value or values on at least one corresponding signal output are imperatively required as input values for at least one unmarked subfunction. In this regard, the inventive method involves an error/plausibility check being performed when the software code is loaded into the automation system.

In an extension of the inventive method, it is conceivable for a block diagram containing marked representational blocks and/or connecting lines to be loaded into the data processing system and then for the marking of subfunctions which are not needed to be accompanied by the removal of existing markings, so that an application-specific functional module (which in this case is regarded as being a predefined functional module) can be used to produce a further, new application-specific functional module, in line with an embodiment of the invention.

In a development of the inventive method, in a subsequent step, the marked elements are graphically masked out of the block diagram by means of the data processing system, so that the block diagram modified in this manner graphically represents the current embodiment of the application-specific functional module, particularly for documentation purposes. This graphical representation can then be printed and/or stored, for example.

In summary, it can be said that the inventive method provides enormous improvements, as compared with the prior art, both when creating an application-specific functional module and when the software code associated with the application-specific functional module is executed in a programmable controller: when creating the application-specific functional module, only the absolutely necessary subfunctions need to be supplied with parameters, and when the application-specific functional module is executed in a programmable controller, it is no longer necessary for the predefined functional module's full software code to be loaded, which results in a sometimes considerable lesser memory space requirement in the automation system and in a sometimes considerably increased execution speed.

For the configuration system, an embodiment of the invention achieves the object by use of a configuration system for producing an application-specific functional module for an automation system from a predefined functional module, the predefined functional module comprising at least two subfunctions implemented by means of software code, having

- a data processing system into which a block diagram graphically describing the predefined functional module can be read, each subfunction having at least one associated representational block in the block diagram, and the representational blocks each including at least one signal input and/or at least one signal output which are supplied with prescribed parameters and/or which are connected to at least one signal input and/or signal output on another representational block by way of a connecting line,
- a marking device which is included in the data processing system and can be used to mark those representational blocks and/or connecting lines in the block diagram which are not needed in order to produce a desired functionality of the application-specific functional module, and
- a loading device which, if output values supplied by the signal outputs of the marked representational blocks are not imperatively required by any of the unmarked representational blocks as input values for at least one of their respective signal inputs for the purpose of calculating a result value for at least one of their signal outputs, can be used to read into the programmable controller only the software code for those subfunctions whose corresponding representational blocks are unmarked, and which,
- if output values supplied by the signal outputs of the marked representational blocks are imperatively required by at least one of the unmarked representational blocks as input values for at least one of their respective signal inputs for the purpose of calculating a result value for at least one of their signal outputs, can be used to read into the programmable controller the software code for those subfunctions whose corresponding representational blocks are unmarked and also the software code for those subfunctions whose corresponding representational blocks are marked and whose output values applied to their respective signal outputs are imperatively required by at least one of the unmarked representational blocks as input values for at least one of their respective signal inputs.

The details and explanations given in connection with the inventive method can be transferred in a similar manner to a configuration system in accordance with the an embodiment of invention and are therefore not repeated at this point.

The text below illustrates two exemplary embodiments of the invention in more detail.

DETAILED DESCRIPTION OF THE PREFERRED EMBODIMENTS

Figure 1:
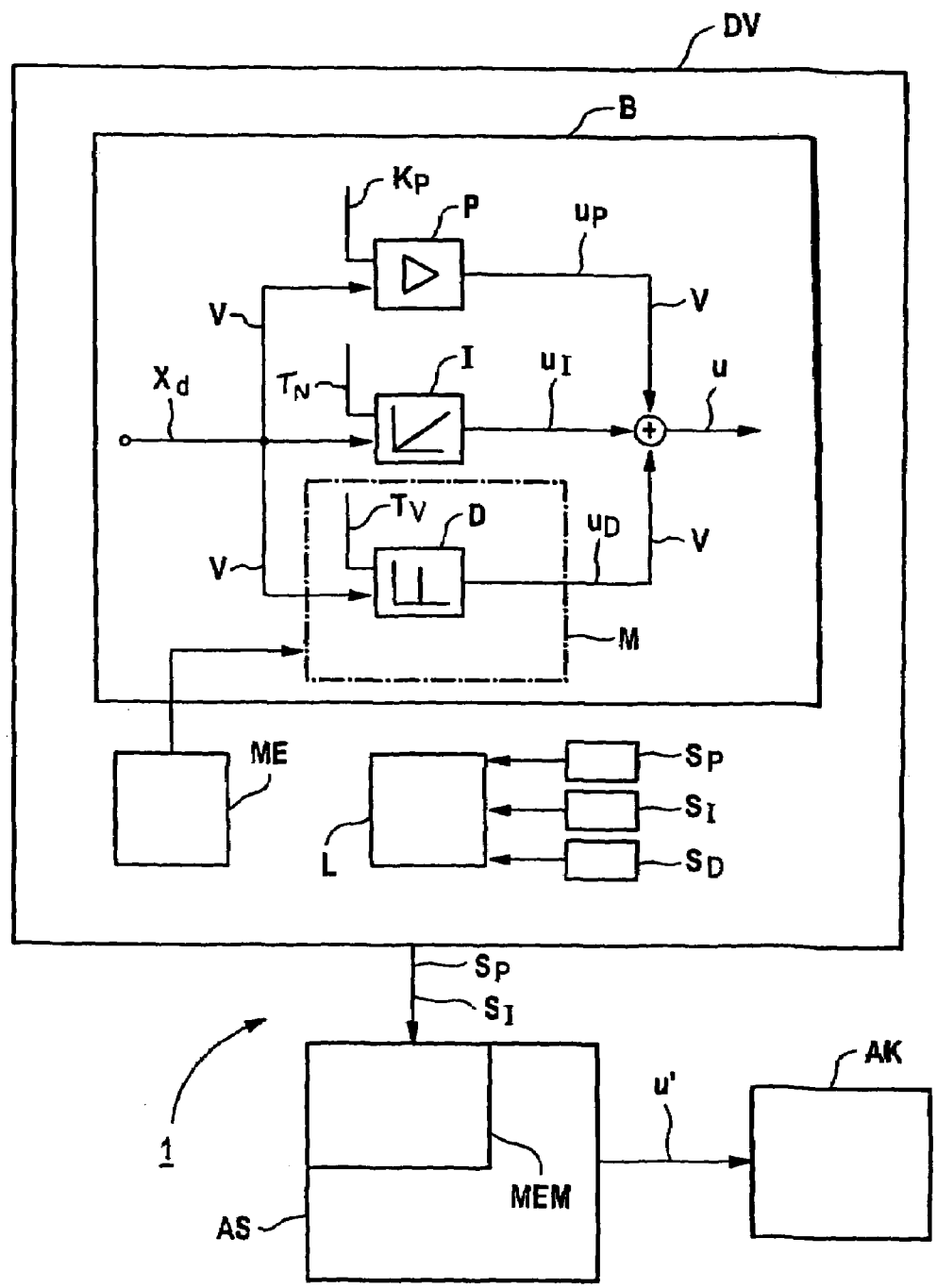
FIG. 1 shows an inventive configuration system for producing an application-specific PID controller module.

FIG. 1 shows an inventive configuration system 1 which includes a data processing system DV. The configuration system 1 is intended to use a predefined functional module—in this case a PID controller module graphically illustrated by means of a block diagram B—to produce an application-specific functional module, the intention in this exemplary embodiment being to produce a PI controller module for a programmable controller AS.

The block diagram B is loaded into the data processing system DV. The PID controller's predefined functional module graphically illustrated by way of the block diagram B comprises three subfunctions, namely a proportional amplifier P, an integrator I and a differentiator D, which are respectively visualized by a representational block in the block diagram B. These three subfunctions can be used to bring the signal output u of the PID controller into line with a desired time profile as a reaction to a control error signal provided in the form of a control error $x_d$. This is done, in particular, by vitue of a suitable choice of parameters $K_P$, $T_N$, $T_V$. In this case, the parameter $K_P$ is the "proportional gain factor" for the proportional amplifier P in the PID controller, the parameter $T_N$ is the previously settable control time for the integrator I in the PID controller, and the parameter $T_V$ is the prescribable timing advance for the differentiator in the PID controller. When using the PID controller's predefined functional module for a specific control task, at least the three said parameters need to be brought into line with the specific instance of application in order to achieve a desired response from the controller.

In many instances of application, a PI controller is sufficient to achieve a good control result, for example. If there is a desire to use a predefined functional module in the form of said PID controller in such an instance of application, then it is necessary to ensure that the differentiator D part does not affect the controller's output signal u. The output signal $u_d$ from the differentiator must therefore not be impressed on the controller's output signal u, or at least it must not alter the controller's output signal u.

In many cases, it is possible to ensure that the result of a subfunction in a predefined functional module does not affect the output signal from the functional module by virtue of a suitable choice of parameter(s) associated with the subfunction. However, it may also be necessary to deactivate at least one connecting line V connecting a signal input and/or signal output for the unwanted subfunction of a predefined functional module to a wanted subfunction in order to prevent the output signal from being undesirably affected by the unwanted subfunction.

In the present case, by way of example, it is not possible to eliminate the differentiator D part of the controller's output signal u completely just by virtue of a suitable choice of parameter $T_V$.

A marking device ME included in the data processing system DV is used to provide the differentiator D with a marking M which, in this case, covers both the representational block for the differentiator D and its connecting lines V to the controller's signal input $x_d$ and to the controller's signal output u.

The software code $S_P$, $S_I$ and $S_D$, corresponding to the representational blocks for the proportional amplifier P, for the integrator I and for the differentiator D, respectively, can likewise be stored in the data processing system DV, for example, particularly in a software library.

A loading device L is used to read the software code $S_P$ and $S_I$, corresponding to the proportional amplifier P and to the integrator I, respectively, into a memory MEM in the programmable controller AS. The software code $S_D$, which corresponds to the marked differentiator D, including its possibly marked connecting lines V, is not read into the programmable controller AS in this case, since the present exemplary embodiment is intended to involve use of the PID controller's predefined functional module to produce an application-specific module for a PI controller, in which the differentiator D part is not necessary and is also not wanted.

Since, in the present case, the signal output $u_D$ of the differentiator D is not imperatively required by any unmarked representational block, that is to say neither by the proportional amplifier P nor by the integrator I, for the purpose of calculating the respective signal outputs $u_P$ and $u_I$ for said unmarked representational blocks, the differentiator D part can be masked out using the marking M, which means that just the software code corresponding to the unmarked representational blocks can be loaded into the memory MEM in the programmable controller AS by means of the loading device L. This prevents, in particular, unnecessary loading of software code which is not needed into the programmable controller AS, which means that firstly the memory MEM in the programmable controller AS is relieved of load and secondly the execution speed of the software code $S_P$ and $S_I$ corresponding to the application-specific functional module is improved. An output signal u', which comprises the output signals $u_P$ and $u_I$ from the proportional amplifier P and from the integrator I, respectively, can now be used to control, by way of example, an installation component AK in a technical installation, with—as desired—an application-specific PI controller having been produced from the predefined functional module for the PID controller.

Consequently, it is now necessary to supply only the proportional gain factor $K_P$ and the control time $T_N$, as parameters for the application-specific PI controller, with suitable values for performing the control task. The parameter $T_V$ additionally provided in the predefined functional module, is not required and does not need to be supplied with a value in the PI controller's application-specific functional module. Thus, both the complexity of configuration and the susceptibility to error when carrying out the control, owing to incorrect parameter values possibly being supplied, are reduced.

Figure 2:
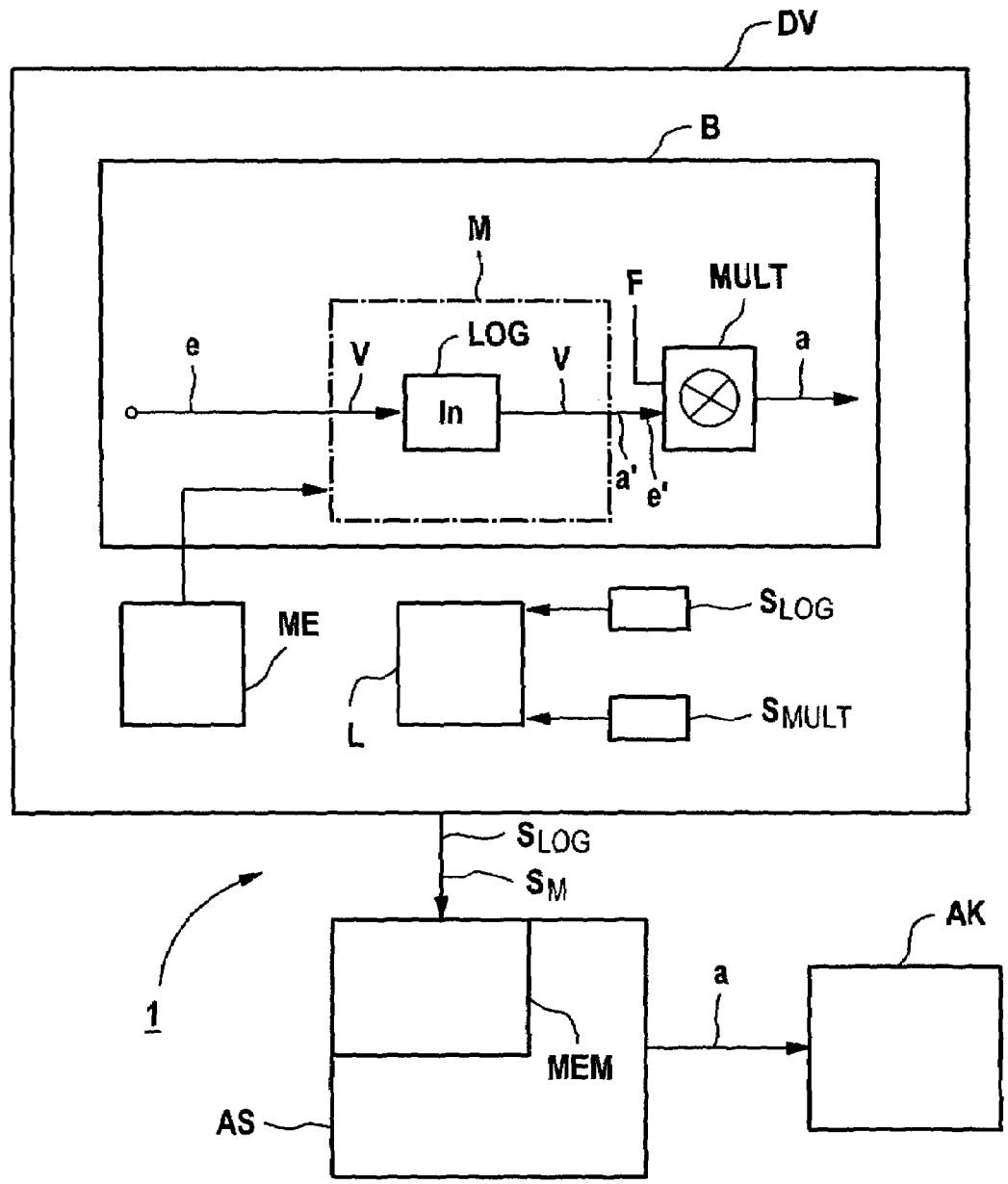
FIG. 2 shows an inventive configuration system for producing an application-specific logarithm module.

FIG. 2 shows an inventive configuration system 1 which involve a block diagram B for a predefined functional module being used to create an application-specific functional module.

In the present case, the predefined functional module is a logarithm module which is used, in a first subfunction, to form the logarithm for a signal applied as input signal e and, in a second subfunction, to multiply this logarithmized value a' as input signal e' by a multiplication factor F in a multiplier MULT and to output it as an output signal a. One instance of application for such a predefined logarithm module is, by way of example, calculation of the attenuation in decibels dB from a signal amplitude provided as an absolute value. In this example, the first subfunction, formed by a logarithmizer LOG, could calculate the common logarithm of the signal amplitude provided as input signal e, and the second subfunction, provided by the multiplier MULT, multiplies the output signal a' from the logarithmizer LOG by the factor F=20. The corresponding output signal a then corresponds to the attenuation of the signal amplitude expressed in decibels dB.

A user now wishing to produce a simple multiplier from the predefined logarithm module, represented by the block diagram B, as an application-specific functional module could now use a marking device ME included in the data processing system DV. This marking device is used to mark the representational block associated with the first subfunction of the logarithmizer LOG and the representational block's connecting lines V to its signal input e or signal input e' on the multiplier MULT in order subsequently to use a loading device L to load the programmable controller AS just with that software code which corresponds to the second subfunction, namely to the multiplier MULT.

In the present exemplary embodiment, however, the output value from the logarithmizer LOG which is applied to the signal output a' is imperatively required as an input value for the signal input e' on the multiplier MULT. In other words, the result value for the first subfunction, connected upstream of the second subfunction, is urgently required for the second subfunction to work so that it can actually calculate a result as a value for its signal output a. In the exemplary embodiment in FIG. 2, it is therefore possible to read both the software code $S_{LOG}$ associated with the logarithmizer LOG and the software code $S_{MULT}$ associated with the multiplier MULT into a memory MEM in the programmable controller AS, in line with the invention.

In this way, a plausibility check is performed to determine whether the software code $S_{LOG}$ corresponding to the marked representational block can really be masked out and does not need to be loaded into the programmable controller AS. In the current example, if a user wishes to use the predefined functional module to deal with the objective, the software code $S_{LOG}$ corresponding to the logarithmizer LOG needs to be able to be read into the programmable controller AS together with the software code $S_{MULT}$ associated with the multiplier MULT, since otherwise the application-specific functional module produced would be incorrect.

If a user in the example in FIG. 2 were to mark the representational block for the multiplier MULT and also its connecting lines V to the signal output a or signal output a' of the logarithmizer LOG in order to obtain the application-specific functional module for a logarithmizer from the predefined functional module without subsequent multiplication. Then the loading device L would be used to load only the software $S_{LOG}$ corresponding to the logarithmizer LOG into the memory MEM in the programmable controller AS, since the output signal a from the multiplier MULT is not imperatively required as an input signal for the logarithmizer's first subfunction connected upstream of the multiplier. In this case, the logarithmizer LOG would calculate the logarithm e from the input signal e and would make this result available as the output signal a'.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing an application-specific function module for a programmable controller from a predefined function module, the predefined functional module including at least two subfunctions implemented by way of software code, the method comprising the steps of:
   a) loading a block diagram graphically describing the predefined functional module into data processing system, each subfunction including at least one associated representational block in the block diagram, and the representational blocks each including at least one of at least one signal input and at least one signal output, wherein the blocks are at least one of supplied with prescribed parameters and connected to at least one of at least one signal input and signal output on another representational block, via a connecting line;

b) providing at least one of the representational block and connecting lines which are not needed for implementing a desired functionality of the application-specific functional module, with a respective marketing in the block diagram; and c) loading the programmable controller, if output values supplied by the signal outputs of the marked representational blocks are not imperatively required by any of the unmarked representational block as input values for at least one of their respective signal inputs for the purpose of calculating a result value for at least one of their signal outputs, only with the software code for subfunctions whose corresponding representational blocks are unmarked, and, loading the programmable controller, if output values supplied by the signal outputs of the marked representational blocks are imperatively required by at least one of the unmarked representational blocks as input values for at least one of the respective signal inputs for the purpose of calculating a result value for at least one of their signal outputs, with the software code for those subfunctions whose corresponding representational blocks are unmarked and with the software code for those subfunctions whose corresponding representational blocks are marked and whose output values applied to their respective signal outputs are imperatively required by at least one of the unmarked representational blocks as input values for at least one of their respective signal inputs.

2. The method as claimed in claim 1, wherein, in a subsequent step, at least one of the marked representational blocks and connecting lines are graphically masked out of the block diagram via the data processing system, so that the block diagram modified in this manner is used for graphically representing the application-specific functional module.

3. The method as claimed in claim 2, wherein the data processing system includes means for archiving the graphical representation of the application-specific functional module.

4. A configuration system for producing an application-specific functional module for a programmable controller from a predefined functional module, the predefined functional module including at least two subfunctions implemented by way of software code, comprising:

a data processing system into which a block diagram graphically describing the predefined functional module is readable, each subfunction including at least one associated representational block in the block diagram, and the representational blocks each including at least of at least one signal input and at least one signal output at least one of supplied with prescribed parameters and connected to at least one of at least one signal input and signal output on another representational block via a connecting line;

a marking device, included in the data processing system and useable to mark at least one of those representational blocks and connecting lines in the block diagram not needed in order to produce a desired functionality of the application-specific functional module; and a loading device adapted to, if output values supplied by the signal outputs of the marked representational blocks are not imperatively required by any of the unmarked representational blocks as input values for at least one of the respective signal inputs for the purpose of calculating a result value for at least one of their signal outputs, read into the programmable controller only the software code for those subfunctions whose corresponding representational blocks are unmarked, the loading device further being adapted to, if output values supplied by the signal outputs of the marked representational blocks are imperatively required by at least one of the unmarked representational blocks as input values for at least one of their respective signal inputs for the purpose of calculating a result value for at least one of the signal outputs, read into the programmable controller the software code for those subfunctions whose corresponding representational blocks are unmarked and also the software code for those subfunctions whose corresponding representational blocks are marked and whose output values applied to their respective signal outputs are imperatively required by at least one of the unmarked representational blocks as input values for at least one of the respective signal inputs.

5. The configuration system as claimed in claim 4, wherein the data processing system is adapted to graphically mask out at least one of the marked representational blocks and connecting lines from the block diagram by use of the data processing system, so that the block diagram modified in this manner is used for graphically representing the application-specific functional module.

6. The configuration system as claimed in claim 5, wherein the data processing system comprises means for archiving the graphical representation of the application-specific functional module.

\* \* \* \* \*